(12) United States Patent
Nagano et al.

(10) Patent No.: US 7,804,644 B2
(45) Date of Patent: Sep. 28, 2010

(54) OPTICAL LEVEL CONTROL DEVICE, METHOD FOR CONTROLLING SAME, AND LASER APPLICATION DEVICE

(75) Inventors: Tsuyoshi Nagano, Kanagawa (JP); Yoshinori Ohta, Kanagawa (JP)

(73) Assignee: Laserfront Technologies, Inc., Kanagawa (JP)

( * ) Notice: Subject to any disclaimer, the term of this patent is extended or adjusted under 35 U.S.C. 154(b) by 148 days.

(21) Appl. No.: 11/522,435

(22) Filed: Sep. 18, 2006

(65) Prior Publication Data

US 2007/0070484 A1 Mar. 29, 2007

(30) Foreign Application Priority Data

Sep. 26, 2005 (JP) ............................. 2005-278935

(51) Int. Cl.
*G02B 5/30* (2006.01)

(52) U.S. Cl. ..................................................... 359/501

(58) Field of Classification Search ........................ None
See application file for complete search history.

(56) References Cited

U.S. PATENT DOCUMENTS 6,297,651 B1 * 10/2001 Akikuni et al. ............. 324/753

FOREIGN PATENT DOCUMENTS

| JP | 61-126524 A | | 6/1986 |
|---|---|---|---|
| JP | 61126524 A | * | 6/1986 |
| JP | 6-34915 A | | 2/1994 |
| JP | 06-106378 A | | 4/1994 |
| JP | 7-177087 A | | 7/1995 |
| JP | 8320456 A | | 12/1996 |
| JP | 2002-028795 A | | 1/2002 |
| JP | 2002224873 A | | 8/2002 |
| WO | WO 03091789 A1 | * | 11/2003 |

* cited by examiner

*Primary Examiner*—Stephone B Allen
*Assistant Examiner*—Derek S Chapel
(74) *Attorney, Agent, or Firm*—Sughrue Mion, PLLC

(57) ABSTRACT

The optical level control device independently controls the intensities of two beams having different wavelengths that are emitted from a laser oscillator, and the optical level control device includes a wavelength-dependent wavelength plate and a polarization beam splitter. The wavelength-dependent wavelength plate functions as a half-wave plate with respect to the first light wave and as a full-wave plate with respect to the second light wave. Only the rotation angle of the polarization beam splitter about the optical axis is adjusted to set the intensity of the second light wave transmitted rectilinearly through the polarization beam splitter. The polarization beam splitter is then fixed at the adjusted angle, and the rotation angle of the wavelength plate about the optical axis is adjusted to set the intensity of the first light wave.

28 Claims, 5 Drawing Sheets

TRANSMITTANCE OF A FUNDAMENTAL WAVE TRANSMITTED RECTILINEARLY THROUGH THE PBS

ROTATION ANGLE OF THE PBS $\theta(°)$

TRANSMITTANCE OF A SECOND
HIGHER HARMONIC TRANSMITTED
RECTILINEARLY THROUGH THE PBS

ROTATION ANGLE OF
THE WAVELENGTH PLATE $\varphi(°)$

OPTICAL LEVEL CONTROL DEVICE, METHOD FOR CONTROLLING SAME, AND LASER APPLICATION DEVICE

BACKGROUND OF THE INVENTION

1. Field of the Invention

The present invention relates to an optical level control device that is capable of arbitrarily varying the intensity of each of a plurality of light waves having different wavelengths that are coupled in essentially the same optical axis, to a method for controlling the same, and to a laser application device that utilizes the optical level control device.

2. Description of the Related Art

There are numerous applications for an optical level control device that arbitrarily varies the intensity of each of a plurality of light beams having different wavelengths in the same optical axis. One example of an application is laser machining. Laser machining is a method by which a laser pulse is radiated to an object in order to perform cutting, perforation, welding, and other processes without touching the object. The wavelength, pulse width, time waveform, peak energy, distribution in the beam section, and other characteristics of the emitted laser are appropriately adjusted according to the light absorption and reflection characteristics, thermal characteristics, and other physical characteristics of the workpiece. In addition, beams of light having a plurality of wavelengths are sometimes mixed together and used. When light having a plurality of wavelengths is used, the ability to arbitrarily vary the intensity of each light makes it possible to single out machining conditions that are suited to the absorption and reflection spectrum characteristics of the workpiece. This ability also increases the degree of freedom in machining. In the fields of biological and medical laser applications, which have recently received attention, a technique is needed for varying the ratios of mixed light according to the site, type of the affected area, and other characteristics of the irradiated body.

Japanese Laid-open Patent Application Nos. 06-106378 and 2002-028795 disclose techniques whereby a laser machining device for emitting a laser to a work object switches and extracts laser light having a plurality of wavelengths from a single laser oscillation device in order to appropriately machine an object that has different wavelength absorption sensitivities.

The technique disclosed in Japanese Laid-open Patent Application No. 06-106378 (pp. 2-4, FIG. 1) is a laser machining device that is configured so that a harmonic generator is used to generate a plurality of wavelengths of light from light outputted by a YAG (Yttrium Aluminum Garnet) laser oscillator, the plurality of wavelengths of light thus generated are spatially separated, and each wavelength of light is transmitted through separate light-varying optical attenuators, after which the light is combined back into a single beam and guided to a machining head. This technique enables proper machining of a sample having different wavelength absorption sensitivities.

The technique disclosed in Japanese Laid-open Patent Application No. 2002-028795 (pp. 4-7, FIG. 1) is a laser welding device whereby an output beam from a first laser device that oscillates with a fundamental wave, and an output beam from a second laser device that outputs SHG (Second Harmonic Generation) light from a separate Q switch are coupled by a dichroic mirror, and condensed light is radiated to an object. This technique makes it possible to form a joint by laser welding that is effective for pure aluminum, pure copper, and other metals whose reflectance and thermal diffusivity are higher than that of an aluminum alloy.

The variable optical attenuators disclosed in Japanese Laid-open Patent Application No. 06-106378 switch and extract laser light having a plurality of wavelengths and radiate the laser light to an object, but do not freely vary the ratio of intensities of a plurality of wavelengths of light that are mixed together.

In Japanese Laid-open Patent Application No. 2002-028795, the constituent elements of the invention do not include a mechanism for adjusting the intensity and other characteristics of the output of either of the two laser devices. This invention therefore does not provide the degree of freedom needed for wide variation of the welding conditions.

SUMMARY OF THE INVENTION

An object of the present invention is to provide an optical level control device that is capable of arbitrarily varying the beam intensity level of each of a plurality of beams of light having different wavelengths in the same optical axis or essentially the same optical axis, a method for controlling the same, and a laser application device that utilizes the optical level control device.

The optical level control device according to the present invention is an optical level control device that is capable of arbitrarily varying a light transmittance of each of two light waves having different wavelengths that are coupled in essentially the same optical axis, wherein the optical level control device comprises a wavelength-dependent wavelength plate that functions as a half-wave plate with respect to a first light wave and as a full-wave plate with respect to a second light wave, and a polarization beam splitter for further transmitting the two light waves transmitted through the wavelength plate.

It is preferred that the wavelength plate and the polarization beam splitter be rotatable about the optical axis, and that a rotation angle of the wavelength plate and the polarization beam splitter be adjusted to set the transmittance of the two light waves rectilinearly transmitted through the polarization beam splitter.

A stage that precedes the wavelength plate may be provided with a separate wavelength-dependent wavelength plate that functions as a quarter-wave plate with respect to a first light wave and as a full-wave plate or a half-wave plate with respect to a second light wave among two light waves having different wavelengths.

A stage subsequent to the polarization beam splitter may be further provided with a separate wavelength-dependent wavelength plate that is capable of rotating about the optical axis and functions as a half-wave plate with respect to a first light wave and as a full-wave plate with respect to a second light wave.

In the method for controlling an optical level control device according to the present invention, the optical level control device has a wavelength-dependent wavelength plate that is capable of rotating about the optical axis and functions as a half-wave plate with respect to a first light wave and as a full-wave plate with respect to a second light wave among two light waves having different wavelengths that are coupled in essentially the same optical axis, and a polarization beam splitter that is capable of rotating about the optical axis and that further transmits the two light waves transmitted through the wavelength plate, wherein the method for controlling the optical level control device comprises adjusting a rotation angle of the wavelength plate and the polarization beam splitter, and arbitrarily setting the transmittance of the two light waves rectilinearly transmitted through the polarization beam splitter.

The adjustment of a rotation angle of the wavelength plate and the polarization beam splitter comprises the steps of fixing a rotation angle of the wavelength plate and rotating the polarization beam splitter, and rotating the wavelength plate in a state in which a rotation angle of the polarization beam splitter is fixed.

The optical level control device may further comprise a separate wavelength-dependent wavelength plate that is provided to a stage prior to the wavelength plate and that functions as a quarter-wave plate with respect to a first light wave and as a full-wave plate or a half-wave plate with respect to a second light wave among two light waves having different wavelengths.

A separate wavelength-dependent wavelength plate that is capable of rotating about the optical axis and that functions as a half-wave plate with respect to a first light wave and as a full-wave plate with respect to a second light wave may be provided to a stage subsequent to the polarization beam splitter, and a step may also be included for rotating the separate wavelength-dependent wavelength plate to provide variability to the angular difference of a principal axis of polarization of the two light waves.

The laser application device according to the present invention comprises a laser beam system, wherein the laser beam system has a laser oscillator for outputting in the same optical axis two light waves having different wavelengths, and any of the optical level control devices described above.

The laser application device according to the present invention may also comprise a laser beam system, wherein the laser beam system has two laser oscillators for generating two light waves having different wavelengths, an optical coupler for coupling and outputting the two light waves in essentially the same optical axis, and any of the optical level control devices described above.

The laser application device according to the present invention may also comprise laser beam systems described above that produce different wavelengths, and an optical coupler for coupling and outputting in essentially the same optical axis a plurality of laser beams that are outputted from the plurality of laser beam systems.

The optical level control device of the present invention comprises a wavelength-dependent wavelength plate that functions as a half-wave plate with respect to a first light wave and as a full-wave plate with respect to a second light wave among two light waves having different wavelengths that are coupled in essentially the same optical axis, and a polarization beam splitter capable of rotating about the optical axis that further transmits the two light waves transmitted through the wavelength plate. It is therefore possible to arbitrarily vary the light transmittance of each of two light waves having different wavelengths that pass through the optical level control device.

DESCRIPTION OF THE PREFERRED EMBODIMENTS

Figure 1:
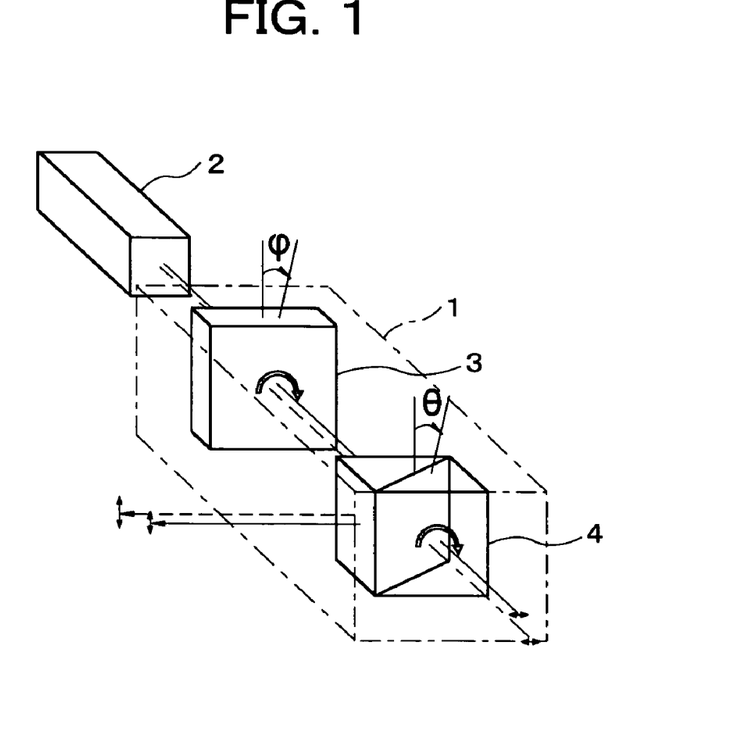
FIG. 1 is a schematic perspective view showing the optical level control device according to a first embodiment of the present invention.

Embodiments of the present invention will next be specifically described with reference to the accompanying drawings. A first embodiment of the present invention will first be described. FIG. 1 is a schematic perspective view showing the optical level control device according to the present embodiment. A laser oscillator 2 emits two light beams simultaneously that have different wavelengths, and the two beams have the same optical axis. One example of this type of laser oscillator is a laser device that is composed of a fundamental wave laser oscillator and a higher harmonic generating element that generates a higher harmonic from the fundamental wave. The conversion efficiency with which the higher harmonic is generated from the fundamental wave by the higher harmonic generating element is not 100%, and is 50%, for example. Accordingly, the output beam of the laser oscillator 2 includes both the fundamental wave and the higher harmonic as components, the energy ratios are 50% for the fundamental wave and 50% for the higher harmonic, and both waves have the same optical axis.

An optical level control device 1 independently controls the intensities of the two beams outputted by the laser oscillator 2. In this optical level control device 1, a wavelength plate 3 and a polarization beam splitter (PBS) 4 are arranged on the optical axis of the light beams from the laser oscillator 2 so that the two beams of light emitted in the same optical axis from the laser oscillator 2 enter the wavelength-dependent wavelength plate 3, and the light beams transmitted through the wavelength plate 3 enter the polarization beam splitter 4.

The wavelength-dependent wavelength plate 3, which is one of the constituent elements of the optical level control device 1, has the following characteristics. The wavelength plate 3 functions as a half-wave plate for one of the light waves among the fundamental wave and the higher harmonic, and functions as a full-wave plate for the other light wave. The wavelength-dependent wavelength plate 3 is also capable of rotating about the optical axis in which light is transmitted. Accordingly, when the wavelength plate 3 is rotated, light waves receiving the effect of a half-wave plate are emitted from the wavelength plate 3 in a state in which the plane of polarization of the light waves is rotated in conjunction with the rotation of the wavelength-dependent wavelength plate 3.

However, light waves receiving the effect of a full-wave plate are emitted from the wavelength plate 3 without the plane of polarization thereof being rotated by the rotation of the wavelength plate 3.

The wavelength plate 3 can be formed using a transparent, birefringent crystal. The wavelength plate 3 may be formed, for example, by grinding a crystal having a wide band of transmitted wavelengths in a direction that is nearly parallel to the C-axis of crystallization.

The polarization beam splitter 4, which is another constituent element of the optical level control device 1, is a commonly used polarization beam splitter, and has a structure formed by affixing together the tilted surfaces of two right-angle prisms in which a dielectric multilayer film is provided to the tilted surfaces thereof. A P wave component is transmitted, and an S wave component is reflected in relation to the tilted surface of the prism. The polarization characteristics of a polarization beam splitter having this structure are not wavelength-dependent. Polarization beam splitters whose polarization characteristics are not wavelength-dependent are already used in the optical heads of optical disk devices provided with three light sources that include a blue LD (semiconductor laser), a red LD, and a near-infrared LD and that record/play back optical disks in high-definition DVD, normal-definition DVD, CD, and other different formats.

Rotating the wavelength-dependent wavelength plate 3 and the polarization beam splitter 4 about the optical axis makes it possible to independently control the intensities of the fundamental wave and the higher harmonic that are transmitted rectilinearly through the polarization beam splitter 4.

The operation of the optical level control device 1 of the first embodiment will next be described. It is assumed that the fundamental wave of the laser oscillator 2 is horizontal, rectilinearly polarized light, and that the higher harmonic generating element is an element that generates a second higher harmonic. More specifically, the higher harmonic generating element is an element that generates a second higher harmonic for which the phase matching condition is type 1. Accordingly, the polarization of the second higher harmonic outputted from the laser oscillator 2 along with the fundamental wave is assumed to be linear polarization that is parallel to the fundamental wave. The thickness of the wavelength plate is also set so that the wavelength-dependent wavelength plate 3 functions as a full-wave plate with respect to the fundamental wave and functions as a half-wave plate with respect to the second higher harmonic.

First, only the rotation angle of the polarization beam splitter 4 about the optical axis is adjusted, and the intensity of the fundamental wave transmitted rectilinearly through the polarization beam splitter 4 is set. The polarization beam splitter 4 is then fixed at the adjusted angle, the rotation angle of the wavelength plate 3 about the optical axis is adjusted, and the intensity of the second higher harmonic is set.

Figure 2:
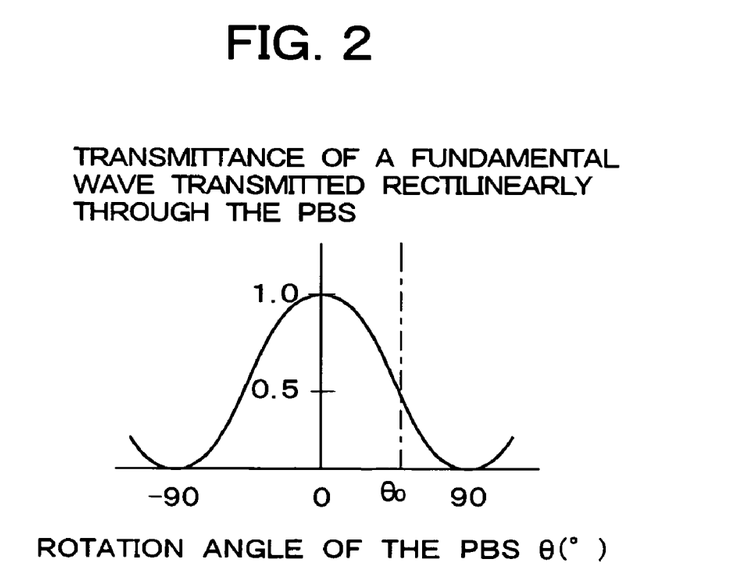
FIG. 2 is a view showing the transmittance of a fundamental wave transmitted rectilinearly through the polarization beam splitter in relation to the rotation angle of the polarization beam splitter provided to the optical level control device of the present invention.

In FIG. 2, the angle at which rectilinearly polarized fundamental light propagates through the polarization beam splitter 4 at maximum transmittance (horizontally polarized light: P-polarized light) is shown as the origin, the angle θ by which the polarization beam splitter 4 is rotated about the optical axis away from the maximum-transmission angle is plotted on the horizontal axis, and the transmittance of a fundamental wave rectilinearly transmitted through the polarization beam splitter 4 is plotted on the vertical axis. When θ=90°, the linearly polarized light of the fundamental wave is incident as S-polarized light on the tilted surface of the polarization beam splitter 4, and the rectilinearly transmitted intensity reaches the minimum. Since the wavelength-dependent wavelength plate 3 functions as a full-wave plate with respect to the fundamental wave, the fundamental wave outputted by the laser oscillator 2 is transmitted in a state in which the direction of linear polarization is maintained regardless of the direction of the C-axis of the wavelength plate, and is incident on the polarization beam splitter 4.

The polarization beam splitter 4 is rotated about the optical axis, and the rectilinearly transmitted intensity shown in FIG. 2 is set to the desired level. Specifically, I=cos 2θ indicates the relationship between the rectilinearly transmitted intensity I of the polarization beam splitter 4 and the angle θ by which the polarization beam splitter 4 is rotated about the optical axis from the horizontal. In a case in which the desired intensity of the fundamental wave passing through the polarization beam splitter 4 is $I_\omega = ½$, a setting of $\theta_0 = 45°$ is made.

Figure 3:
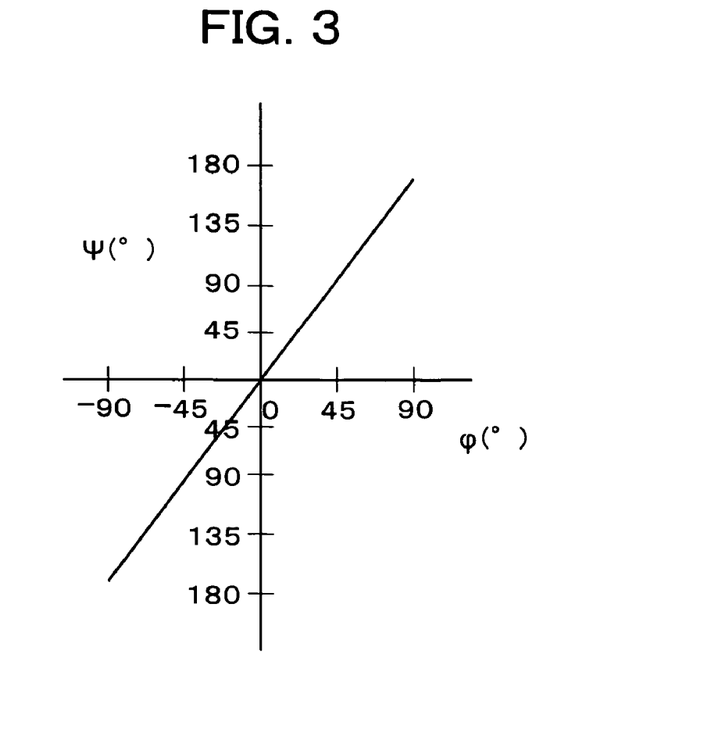
FIG. 3 is a view showing the rotation angle of polarization of a second higher harmonic in relation to the rotation angle of the wavelength plate provided to the optical level control device of the present invention.
Figure 4:
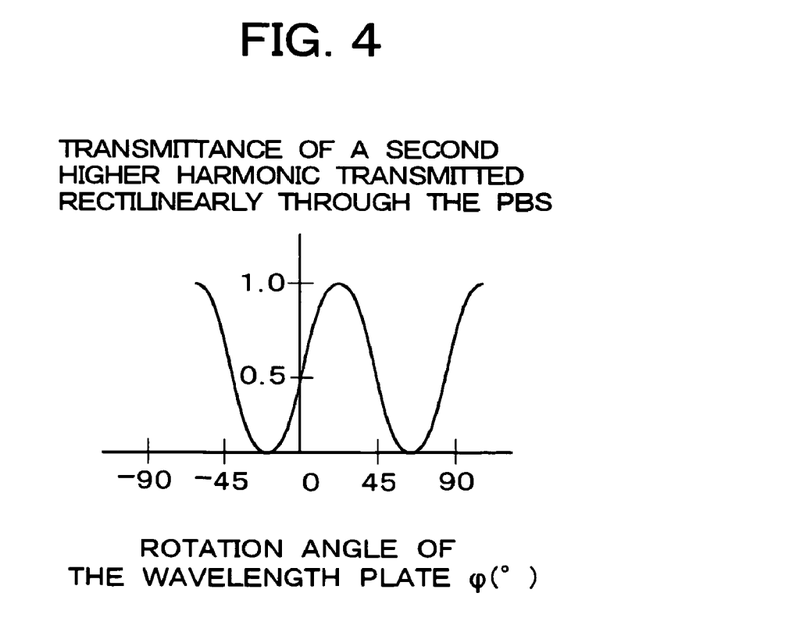
FIG. 4 is a view showing the transmittance of a second higher harmonic transmitted rectilinearly through the polarization beam splitter in relation to the rotation angle of the wavelength plate provided to the optical level control device of the present invention.

The second higher harmonic, which is the other light wave emitted from the laser oscillator 2, is also horizontally polarized. The wavelength-dependent wavelength plate 3 functions as a half-wave plate with respect to the second higher harmonic. The polarization angle Ψ of the linear polarized light exiting the wavelength plate 3 is Ψ=2φ, as shown in FIG. 3, where φ is the angle by which the direction of the C-axis of the wavelength plate is tilted from horizontal. Accordingly, the intensity of the second harmonic transmitted rectilinearly through the polarization beam splitter 4 varies as shown in FIG. 4 with respect to the rotation angle φ of the wavelength plate. In order to divide in half the transmittance of the fundamental wave transmitted through the polarization beam splitter 4, φ=22.5° is set as the rotation angle of the wavelength plate that yields a transmittance of 1 of the second higher harmonic transmitted through the polarization beam splitter 4. This is because the polarization beam splitter 4 is already rotated by $\theta_0 = 45°$. The intensity of the second higher harmonic transmitted rectilinearly through the polarization beam splitter 4 can thus be set independently from the fundamental wave by rotating the wavelength plate 3 to an arbitrary angle φ.

A case is described above in the present embodiment in which the two light waves are a fundamental wave and a second higher harmonic, but the relationship of the wavelengths is not limited by this example. The two wavelengths herein are designated as $\lambda_1$ and $\lambda_2$. It is assumed that the wavelength-dependent wavelength plate 3 functions as a full-wave plate with respect to $\lambda_1$ and as a half-wave plate with respect to $\lambda_2$. When the thickness of the wavelength plate is t, the difference in phase between the ordinary component and the extraordinary component exiting the wavelength plate is given by Eqs. 1 and 2 below.

$$\Delta n_1 \cdot t = p \cdot \lambda_1 \qquad [\text{Eq. 1}]$$

$$\Delta n_2 \cdot t = (2q + 1) \cdot \frac{\lambda_2}{2} \qquad [\text{Eq. 2}]$$

In these equations, $\Delta n_1$ and $\Delta n_2$ are birefringence magnitudes for wavelengths $\lambda_1$ and $\lambda_2$, and p and q are positive integers. Eliminating t from Eqs. 1 and 2 yields Eq. 3 below.

$$q = p \cdot \frac{\Delta n_2}{\Delta n_1} \cdot \frac{\lambda_1}{\lambda_2} - \frac{1}{2} \qquad [\text{Eq. 3}]$$

In this equation, q is found (p and q may be inverted) by substituting the real values of the wavelengths used for wavelengths $\lambda_1$ and $\lambda_2$, substituting the real values of the birefringence magnitudes of the optical crystal used for $\Delta n_1$ and $\Delta n_2$, and substituting an appropriate positive integer for p. The term q is not necessarily a positive integer. The value of p is varied so that the difference between q and a positive integer is equal to or less than a desired value. The thickness t of the wavelength plate can be determined from the value of p when the difference between q and a positive integer is equal to or less than the desired value. A wavelength plate with this thickness functions reliably as a full-wave plate with respect to wavelength $\lambda_1$, but for wavelength $\lambda_2$, the difference in phase between the ordinary component and the extraordinary component becomes offset from the half wavelength by an amount commensurate with the wavelength obtained by multiplying a half wavelength by the difference between q and a positive integer.

A computation is performed as a numerical example in which quartz is used as the optical crystal, and $\lambda_1$ and $\lambda_2$ are a fundamental wave and a second higher harmonic, as in the embodiment described above, wherein $\lambda_1$=1.06 µm and $\lambda_2$=0.53 µm. The refractive indices of the crystal are $\Delta n_1$=0.0087 and $\Delta n_2$=0.0092, and when p=47 is substituted, q=98.9023. The difference between q and 99 is 0.097, which is a difference of about 1/20 wavelength. At this time, t=5.7 mm, which is a realizable thickness.

In the optical level control device according to the embodiment described above, the two light waves have the same optical axis, are related in wavelength as a fundamental wave and a higher harmonic, and are also polarized in the same direction. However, the optical level control device is not limited by these conditions. It is sufficient insofar as the optical axes of the two light waves are essentially the same to allow mixing by an optical coupler or the like, the wavelengths may also be arbitrary, and the optical level control device of the present invention operates effectively even when the light waves are in different polarization states.

Figure 5:
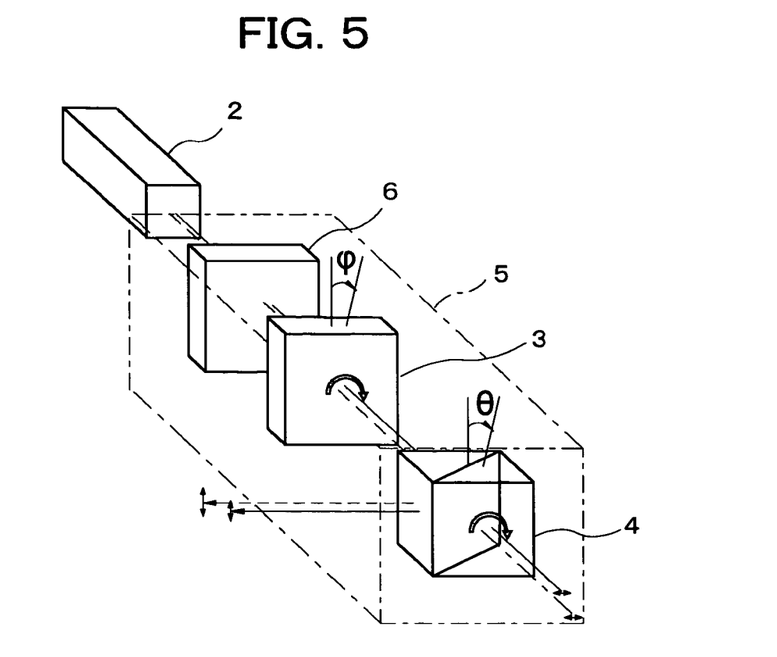
FIG. 5 is a schematic perspective view showing the structure of the optical level control device according to a second embodiment of the present invention.

A second embodiment of the present invention will next be described. FIG. 5 is a schematic perspective view showing the structure of the optical level control device 5 according to the present embodiment. The same reference symbols are used in FIG. 5 for structural components that are the same as those in FIG. 1, and detailed descriptions of those components are omitted. In the first embodiment described above, the phase matching condition of the second higher harmonic generating element was type 1 according to a nonlinear wave equation, but the phase matching condition may be of another type, such as type 2, for example. In this case, even when the fundamental wave incident on the second higher harmonic generating element is linearly polarized light, the fundamental wave that is emitted without being completely converted to a second higher harmonic receives the birefringent effects of the nonlinear optical crystal that converts the wave to a second higher harmonic, and the light is generally emitted as elliptically polarized light. Therefore, the transmittance of the fundamental wave rectilinearly transmitted through the polarization beam splitter with respect to the rotation angle θ of the polarization beam splitter in FIG. 2 is reduced so as not to reach a maximum value of 1, and is also increased so as not to reach a minimum value of 0. The dynamic range of the fundamental wave outputted from the optical level control device 1 is thus reduced.

The optical level control device 5 according to the present embodiment independently controls the intensities of two beams outputted from a laser oscillator 2. This optical level control device 5 is provided with a polarization beam splitter 4 and a wavelength-dependent wavelength plate 3 that is capable of rotating about the optical axis. The optical level control device 5 is furthermore provided with a second wavelength-dependent wavelength plate 6 that is fixed in place, has no rotation mechanism, and is provided to a stage prior to the wavelength-dependent wavelength plate 3. The second wavelength-dependent wavelength plate 6 functions as a quarter-wave plate with respect to a first light wave and as a full-wave plate or a half-wave plate with respect to a second light wave among two light waves having different wavelengths. The thickness of the wavelength plate herein is set so that the wavelength plate functions as a quarter-wave plate with respect to the fundamental wave and as a full-wave plate or half-wave plate with respect to the second higher harmonic. This design method can be implemented in the same manner as the abovementioned design method using Eqs. 1 and 2 described above in the first embodiment. As described above, among the fundamental wave and the second higher harmonic outputted by the laser oscillator, the fundamental wave is converted to linearly polarized light by the functioning of the second wavelength plate 6 as a quarter-wave plate in the type of case in which the fundamental wave is elliptically polarized light, whereas the second higher harmonic is linearly polarized light. However, the second higher harmonic is emitted unmodified as linearly polarized light through the functioning of the second wavelength plate 6 as a full-wave plate or a half-wave plate. It is thereby possible to rotate the polarization beam splitter 4 and the wavelength-dependent wavelength plate 3 about the optical axis to arbitrarily set the levels of two light waves that are rectilinearly transmitted through the polarization beam splitter 4, in the same manner as in the first embodiment.

Figure 6:
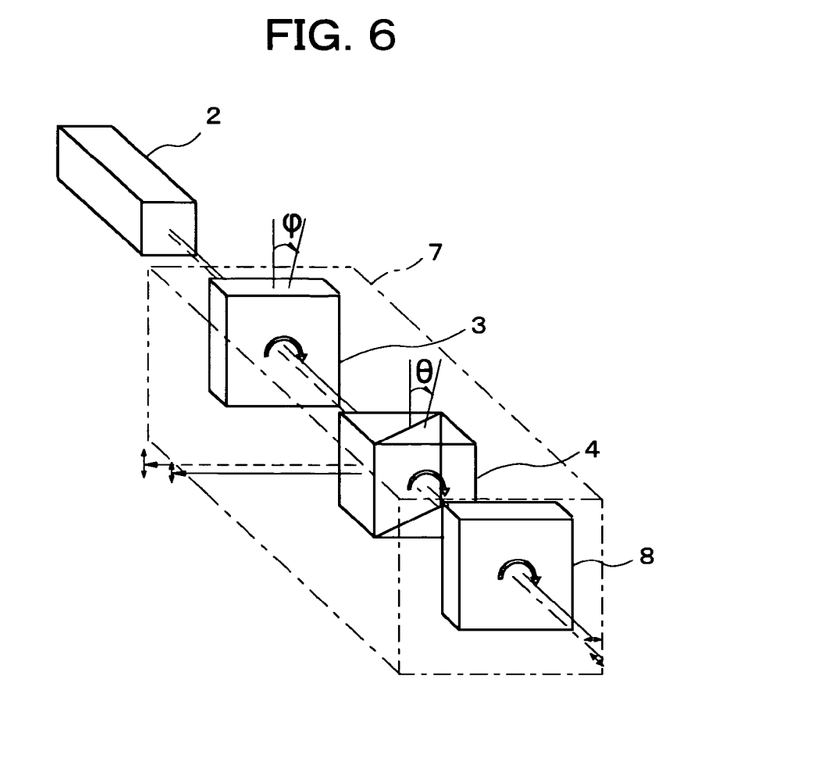
FIG. 6 is a schematic perspective view showing the structure of the optical level control device according to a third embodiment of the present invention.

A third embodiment of the present invention will next be described. FIG. 6 is a schematic perspective view showing the structure of the optical level control device 7 according to the present embodiment. The same reference symbols are used in FIG. 6 for structural components that are the same as those in FIGS. 1 and 5, and detailed descriptions of those components are omitted. The optical level control device 7 according to the present embodiment is capable of independently controlling the intensities of two beams outputted from a laser oscillator 2, and is also capable of arbitrarily controlling the difference in the angles of the two light beams in the polarization direction thereof. In addition to a polarization beam splitter 4 and a first wavelength-dependent wavelength plate 3 that is capable of rotating about the optical axis, the optical level control device 7 is also provided with a third wavelength-dependent wavelength plate 8 that has a rotation mechanism and is provided to a stage subsequent to the polarization beam splitter 4. The third wavelength-dependent wavelength plate 8 has the same function as the first wavelength-dependent wavelength plate 3. The wavelength plate 8 functions as a half-wave plate with respect to a first light wave and as a full-wave plate with respect to a second light wave among two light waves having different wavelengths. Specifically, this structure additionally includes a rotatable, wavelength-dependent wavelength plate 8 that is provided to a latter stage in the optical axis direction of the optical level control device 1 according to the first embodiment shown in FIG. 1. The angular difference between the polarization directions of two light beams outputted from the optical level control device 7 according to the present embodiment can therefore be arbitrarily set by rotating the third wavelength-dependent wavelength plate 8, whereas the two light beams outputted from the optical level control device 1 according to the first embodiment are linearly polarized light beams that are polarized in the same direction as the light beams that are rectilinearly transmitted as P waves through the polarization beam splitter 4. Therefore, utilizing the optical level control device 7 according to the present embodiment in a laser machining device enables more effective laser machining to be performed when the machining characteristics of the workpiece are both wavelength-dependent and polarization-dependent.

Figure 7:
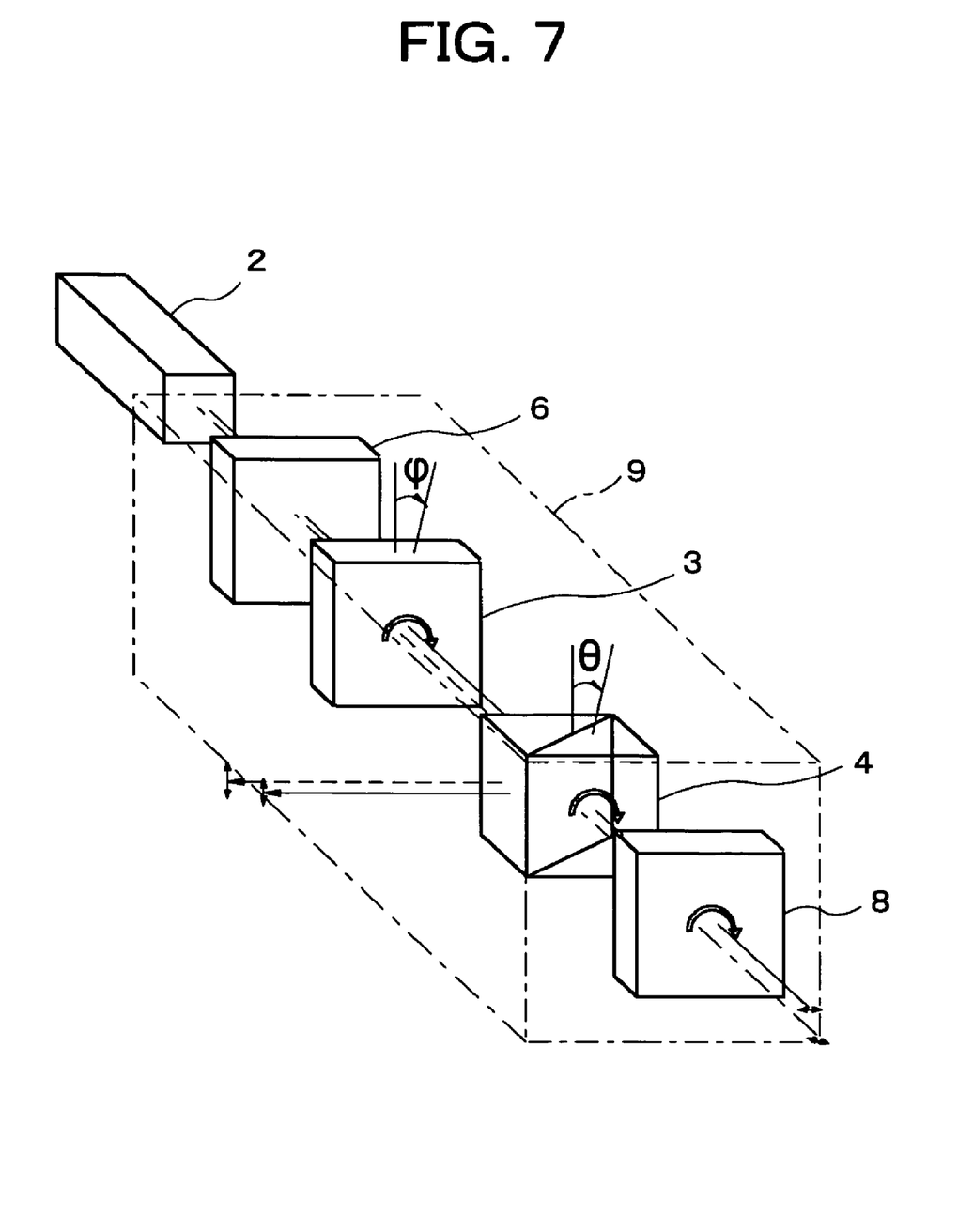
FIG. 7 is a schematic perspective view showing the structure of the optical level control device according to a fourth embodiment of the present invention.

A fourth embodiment of the present invention will next be described. FIG. 7 is a schematic perspective view showing the structure of the optical level control device 9 according to the present embodiment. The same reference symbols are used in FIG. 7 for structural components that are the same as those in FIGS. 1, 5, and 6, and detailed descriptions of those components are omitted. The optical level control device 9 according to the present embodiment is capable of independently controlling the intensities of two beams without reducing the dynamic range of the control that include a fundamental wave and a second higher harmonic outputted from a laser oscillator 2, even when the fundamental wave is elliptically polarized light. The optical level control device 9 is also capable of arbitrarily controlling the angular difference between the polarization directions of the two light beams outputted from the optical level control device. The structure of the optical level control device 9 additionally includes a rotatable, wavelength-dependent wavelength plate 8 that is provided to a latter stage in the optical axis direction of the optical level control device 5 according to the second embodiment shown in FIG. 5. The angular difference between the polarization directions of two light beams outputted from the optical level control device 9 according to the present embodiment can therefore be arbitrarily set by rotating the third wavelength-dependent wavelength plate 8, whereas the two light beams outputted from the optical level control device 5 according to the second embodiment are linearly polarized light beams that are polarized in the same direction. Therefore, in the same manner as in the third embodiment, utilizing the optical level control device 9 according to the present embodiment in a laser machining device enables more effective laser machining to be performed.

Figure 8A:
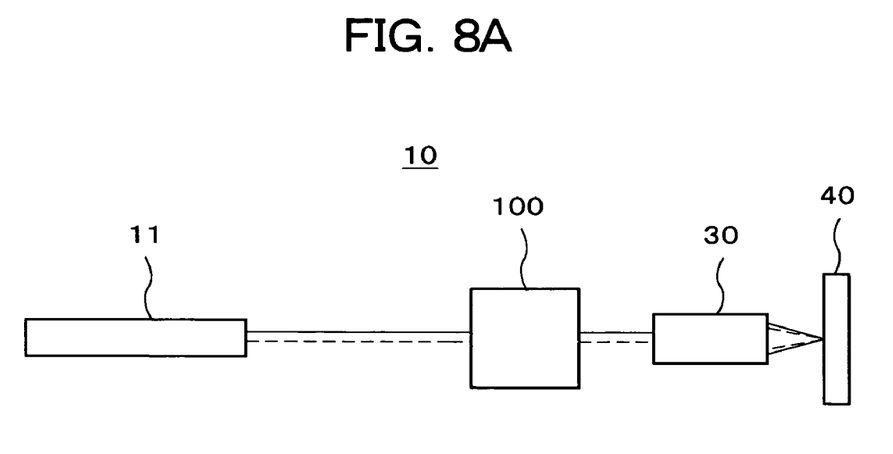
FIGS. 8A and 8B are views showing the structure of the optical system of a laser machining device that utilizes the optical level control device of the present invention.
Figure 8B:
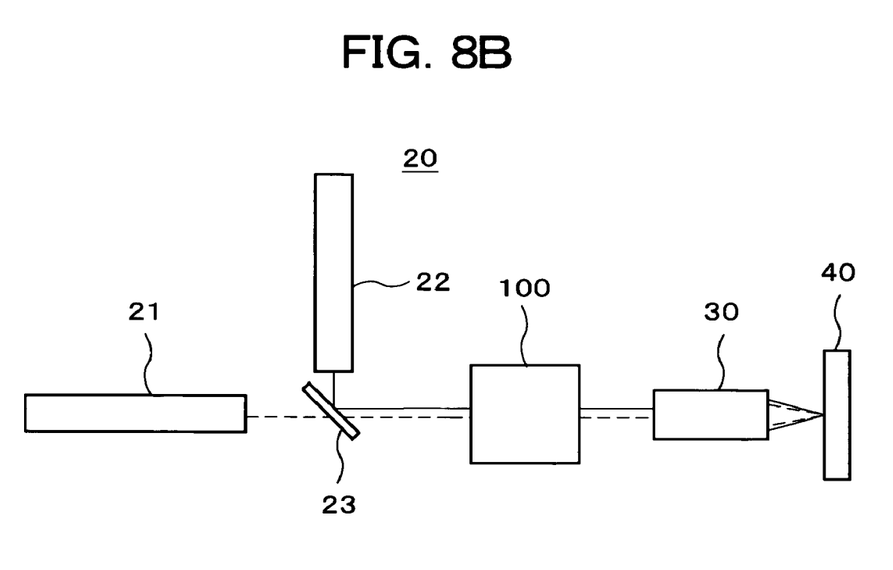

A fifth embodiment of the present invention will next be described. FIG. 8 includes structural block views showing a laser application device that utilizes the optical level control device according to the present invention, wherein the optical system of the laser machining device is shown in particular. The same reference symbols are used for structural components that are the same as those in FIGS. 1 and 5 through 7, and detailed descriptions of those components are omitted. As shown in FIG. 8A, the optical system 10 of a laser machining device according to the present embodiment comprises a laser oscillator 11 for outputting a fundamental wave and a second higher harmonic in the same optical axis, the optical level control device 100 as described in the first through fourth embodiments of the present invention, and a condensing optical system 30. One or both parameters selected from the level and polarization direction of the fundamental wave and second higher harmonic are controlled by the optical level control device 100, and a work object 40 is irradiated.

As shown in FIG. 8B, the optical system 20 of a laser machining device according to the present embodiment may comprise a laser oscillator 21 for outputting a beam having a first wavelength, a laser oscillator 22 for outputting a beam having a second wavelength, an optical coupler 23 for coupling the two beams, the optical level control device 100 as described in the first through fourth embodiments of the present invention, and a condensing optical system 30. One or both parameters selected from the level and polarization direction of the first-wavelength light are controlled by the optical level control device 100, and the light is radiated to a work object 40.

Utilizing the optical level control device 100 according to the present invention in a laser machining device enables more effective laser machining to be performed even when the machining characteristics of the work object 40 are wavelength-dependent as well as polarization-dependent.

The level and polarization direction of a larger number of laser beams can also be controlled by providing a plurality of units in which the laser oscillator 11 and optical level control device 100 shown in FIG. 8A are combined, and using an optical coupler to couple the light outputted by the optical level control devices. The same can be achieved by providing a plurality of units in which the laser oscillator 21, an optical coupler 23, and optical level control device 100 shown in FIG. 8B are combined, and using an optical coupler to couple the light outputted by the optical level control devices.

The laser application device that utilizes the optical level control device according to the present invention was described using as an example the optical system of a laser machining device in FIGS. 8A and 8B, but this type of optical system can also be applied in laser microscopes and other laser observation devices.

What is claimed is:

1. An optical level control device comprising:
   a wavelength-dependent wavelength plate that receives a light beam containing a first wavelength which is linearly polarized and a second wavelength which is linearly polarized, said wavelength plate functioning as a half-wave plate with respect to said first wavelength and as a full-wave plate with respect to said second wavelength, and
   a polarization beam splitter which receives said first wavelength and said second wavelength from said wavelength plate and transmits and reflects said first wavelength and said second wavelength, such that a transmittance of said first wavelength and a transmittance of said second wavelength along essentially a same optical axis are based on the polarization of said first wavelength and said second wavelength.

2. The optical level control device according to claim 1,
   wherein said wavelength plate and said polarization beam splitter can be rotated; and
   wherein a rotation angle of said wavelength plate and said polarization beam splitter is adjusted to set the transmittance of said first wavelength and the transmittance of said second wavelength transmitted through said polarization beam splitter.

3. The optical level control device according to claim 2, further comprising a separate wavelength-dependent wavelength plate that is provided to a stage prior to said wavelength plate and that functions as a quarter-wave plate with respect to said first wavelength and as a full-wave plate or a half-wave plate with respect to said second wavelength.

4. The optical level control device according to claim 3, wherein said separate wavelength-dependent wavelength plate converts said first light wave from circularly polarized light to linearly polarized light.

5. The optical level control device according to claim 2, further comprising a separate wavelength-dependent wavelength plate that is provided to a stage subsequent to said polarization beam splitter, that is capable of rotating about said optical axis, and that functions as a half-wave plate with respect to said first wavelength and as a full-wave plate with respect to said second wavelength.

6. A laser application device comprising a laser beam system, wherein the laser beam system has
   a laser oscillator for outputting in the same optical axis said first and second wavelengths; and
   the optical level control device according to claim 2.

7. A laser application device comprising:
    a plurality of laser beam systems according to claim 6 that produce said first and second wavelengths; and
    an optical coupler for coupling and outputting in essentially the same optical axis said first and second wavelengths outputted from said plurality of laser beam systems.

8. A laser application device comprising a laser beam system, wherein the laser beam system has
    two laser oscillators for generating said first and second wavelengths;
    an optical coupler for coupling and outputting said first and second wavelengths in essentially the same optical axis; and
    the optical level control device according to claim 2.

9. A laser application device comprising:
    a plurality of laser beam systems according to claim 8 that produce said first and second wavelengths; and
    an optical coupler for coupling and outputting in essentially the same optical axis said first and second wavelengths outputted from said plurality of laser beam systems.

10. A laser application device comprising a laser beam system, wherein the laser beam system has
    a laser oscillator for outputting in the same optical axis said light beam comprising said first and second wavelengths; and
    the optical level control device according to claim 1.

11. A laser application device comprising:
    a plurality of laser beam systems according to claim 10 that produce said first and second wavelengths; and
    an optical coupler for coupling and outputting in essentially the same optical axis said first and second wavelengths outputted from said plurality of laser beam systems.

12. A laser application device comprising a laser beam system, wherein the laser beam system has
    two laser oscillators for generating said first and second wavelengths;
    an optical coupler for coupling and outputting said first and second wavelengths in essentially the same optical axis; and
    the optical level control device according to claim 1.

13. A laser application device comprising:
    a plurality of laser beam systems according to claim 12 that produce said first and second wavelengths; and
    an optical coupler for coupling and outputting in essentially the same optical axis said first and second wavelengths outputted from said plurality of laser beam systems.

14. The optical level control device according to claim 1, wherein said wavelength plate and said polarization beam splitter can be independently rotated.

15. The optical level control device according to claim 1, wherein a rotation angle of said wavelength plate is adjusted to set the transmittance of said second wavelength transmitted through said polarization beam splitter.

16. The optical level control device according to claim 1, wherein a rotation angle of said polarization beam splitter is adjusted to set the transmittance of said second wavelength transmitted through said polarization beam splitter.

17. The optical level control device according to claim 1, wherein said wavelength plate and said polarization beam splitter rotate, and wherein said wavelength plate and said polarization beam splitter are independently rotated to set the transmittance of said first and second wavelengths.

18. The optical level control device according to claim 1, wherein said wavelength-dependent wavelength plate and said polarization beam splitter are configured to vary at least one of an intensity level of said transmittance of said first wavelength and an intensity level of said transmittance of said second wavelength.

19. A method for controlling an optical level control device comprising:
    at a wavelength dependent wavelength plate, receiving a light beam comprising a first wavelength which is linearly polarized and a second wavelength which is linearly polarized and rotating a polarization of said first wavelength and rotating a polarization of said second wavelength; and
    at a polarization beam splitter, receiving said first wavelength and said second wavelength output from said wavelength-dependent wavelength plate, and transmitting and reflecting said first wavelength and said second wavelength through said polarization beam splitter such that a transmittance of said first wavelength and a transmittance of said second wavelength along essentially a same optical axis are based on the polarization of said first wavelength and said second wavelength.

20. A method for controlling the optical level control device according to claim 19, further comprising varying at least one of an intensity level of said transmittance of said first wavelength and an intensity level of said transmittance of said second wavelength.

21. A method for controlling the optical level control device according to claim 19, further comprising:
    rotating said wavelength plate and said polarization beam splitter; and
    adjusting rotation angles of said wavelength plate and said polarization beam splitter to set the ratio of the first wavelength to the second wavelengths transmitted through said polarization beam splitter.

22. The method for controlling the optical level control device, according to claim 21, wherein said adjustment of said rotation angles of said wavelength plate and said polarization beam splitter comprises the steps of
    fixing said rotation angle of said wavelength plate and rotating said polarization beam splitter; and
    rotating said wavelength plate in a state in which said rotation angle of said polarization beam splitter is fixed.

23. The method for controlling an optical level control device, according to claim 22, wherein
    said optical level control device further comprises a separate wavelength-dependent wavelength plate that is capable of rotating about said optical axis and that functions as a half-wave plate with respect to said first wavelength and as a full-wave plate with respect to said second wavelength, said wavelength plate being provided to a stage subsequent to said polarization beam splitter; and
    said method rotating said separate wavelength-dependent wavelength plate to provide variability to the angular difference of a principal axis of polarization of said first and second wavelengths.

24. The method for controlling the optical level control device, according to claim 21, wherein
    said optical level control device further comprises a separate wavelength-dependent wavelength plate that is provided to a stage prior to said wavelength plate and that functions as a quarter-wave plate with respect to said first wavelength and as a full-wave plate or a half-wave plate with respect to said second wavelength.

25. An optical level control device comprising:

a wavelength-dependent wavelength plate that receives a light beam containing a first wavelength which is linearly polarized and a second wavelength which is linearly polarized, said wavelength plate functioning as a half-wave plate with respect to said first wavelength and as a full-wave plate with respect to said second wavelength, and a polarization beam splitter which receives said first wavelength and said second wavelength from said wavelength plate and transmits and reflects said first wavelength and said second wavelength, such that a transmittance of said first wavelength and a transmittance of said second wavelength are based on the polarization of said first wavelength and said second wavelength, wherein said wavelength plate and said polarization beam splitter can be rotated; and wherein a rotation angle of said wavelength plate and said polarization beam splitter is adjusted to set the transmittance of said first wavelength and the transmittance of said second wavelength transmitted through said polarization beam splitter.

26. An optical level control device comprising:

a wavelength-dependent wavelength plate that receives a light beam containing a first wavelength which is linearly polarized and a second wavelength which is linearly polarized, said wavelength plate functioning as a half-wave plate with respect to said first wavelength and as a full-wave plate with respect to said second wavelength, and a polarization beam splitter which receives said first wavelength and said second wavelength from said wavelength plate and transmits and reflects said first wavelength and said second wavelength, such that a transmittance of said first wavelength and a transmittance of said second wavelength are based on the polarization of said first wavelength and said second wavelength, wherein said wavelength plate and said polarization beam splitter can be independently rotated.

27. A method for controlling an optical level control device comprising:

at a wavelength dependent wavelength plate, receiving a light beam comprising a first wavelength which is linearly polarized and a second wavelength which is linearly polarized and rotating a polarization of said first wavelength and rotating a polarization of said second wavelength;

at a polarization beam splitter, receiving said first wavelength and said second wavelength output from said wavelength-dependent wavelength plate, and transmitting and reflecting said first wavelength and said second wavelength through said polarization beam splitter such that a transmittance of said first wavelength and a transmittance of said second wavelength are based on the polarization of said first wavelength and said second wavelength;

rotating said wavelength plate and said polarization beam splitter; and adjusting rotation angles of said wavelength plate and said polarization beam splitter to set the ratio of the first wavelength to the second wavelengths transmitted through said polarization beam splitter.

28. A method for controlling an optical level control device comprising:

at a wavelength dependent wavelength plate, receiving a light beam comprising a first wavelength which is linearly polarized and a second wavelength which is linearly polarized and rotating a polarization of said first wavelength and rotating a polarization of said second wavelength;

at a polarization beam splitter, receiving said first wavelength and said second wavelength output from said wavelength-dependent wavelength plate, and transmitting and reflecting said first wavelength and said second wavelength through said polarization beam splitter such that a transmittance of said first wavelength and a transmittance of said second wavelength are based on the polarization of said first wavelength and said second wavelength; and independently rotating said wavelength plate and said polarization beam splitter.

* * * * *